(12) United States Patent
Zhang et al.

(10) Patent No.: US 10,074,970 B2
(45) Date of Patent: Sep. 11, 2018

(54) BUS EXPLOSION PROOF NETWORK AND EXPLOSION PROOF NODE STRUCTURE THEREOF

(71) Applicants: METTLER TOLEDO(CHANGZHOU)PRECISION INSTRUMENT LTD., Changzhou, Jiangsu (CN); METTLER TOLEDO (CHANGZHOU) MEASUREMENT TECH. LTD., Changzhou, Jiangsu (CN); METTLER TOLEDO (CHANGZHOU) SCALE & SYSTEM LTD., Changzhou, Jiangsu (CN)

(72) Inventors: Ying Zhang, Jiangsu (CN); Zhitie Lin, Jiangsu (CN); Yangjie Xu, Jiangsu (CN)

(73) Assignees: METTLER TOLEDO (CHANGZHOU) PRECISION INSTRUMENT LTD., Changzhou, Jiangsu (CN); METTLER TOLEDO (CHANGZHOU) MEASUREMENT TECHNOLOGY LTD., Changzhou, Jiangsu (CN); METTLER TOLEDO (CHANGZHOU) SCALE & SYSTEM LTD., Changzhou, Jiangsu (CN)

( * ) Notice: Subject to any disclaimer, the term of this patent is extended or adjusted under 35 U.S.C. 154(b) by 336 days.

(21) Appl. No.: 14/867,596

(22) Filed: Sep. 28, 2015

(65) Prior Publication Data
US 2016/0020602 A1    Jan. 21, 2016

Related U.S. Application Data

(63) Continuation of application No. PCT/CN2014/074175, filed on Mar. 27, 2014.

(30) Foreign Application Priority Data

Mar. 27, 2013 (CN) .......................... 2013 1 0102280

(51) Int. Cl.
*H02K 9/00* (2006.01)
*H04L 12/00* (2006.01)
(Continued)

(52) U.S. Cl.
CPC .............. *H02H 9/00* (2013.01); *H02H 9/005* (2013.01); *H02H 9/008* (2013.01);
(Continued)

(58) Field of Classification Search
CPC ....................................................... H02H 9/00
See application file for complete search history.

(56) References Cited

U.S. PATENT DOCUMENTS 5,144,517 A    9/1992  Wieth
5,335,730 A *  8/1994  Cotham, III ............ E21B 34/16
                                                        166/374
(Continued)

FOREIGN PATENT DOCUMENTS

CN    1082213 A    2/1994
CN    101599880 A  12/2009
(Continued)

OTHER PUBLICATIONS

International Search Report (PCT/ISA/210) dated Jun. 30, 2014, by the Chinese Patent Office as the International Searching Authority for International Application No. PCT/CN2014/074175.
(Continued)

*Primary Examiner* — Mamadou Diallo
(74) *Attorney, Agent, or Firm* — Buchanan Ingersoll & Rooney PC

(57) ABSTRACT

A CAN bus explosion proof node structure is disclosed which includes a physical parameter sensor, a physical
(Continued)

parameter measurement circuit, a master controller, a data storage module, a communication interface module, and a power voltage and current limiting module. The master controller performs service processing of the digital signals, compares them with respective threshold levels to determine whether dangerous situations occur for the explosion proof node, and sends out an alarm when dangerous situations occur for the explosion proof node. The power voltage and current limiting module limits a maximum open circuit voltage and a maximum short circuit current of input power so that explosive gas and dust will not ignite when the nodes are in normal operation or experience failures.

15 Claims, 3 Drawing Sheets

(51) Int. Cl.
  *H02H 9/00* (2006.01)
  *H04L 12/40* (2006.01)
(52) U.S. Cl.
  CPC .. *H04L 12/40019* (2013.01); *H04L 12/40039* (2013.01); *H04L 12/40195* (2013.01); *H04L 2012/40215* (2013.01)

(56) References Cited

U.S. PATENT DOCUMENTS

| | | | |
|---|---|---|---|
| 7,486,495 | B1 | 2/2009 | Diederichs et al. |
| 8,587,414 | B2 | 11/2013 | Bandyopadhyay et al. |
| 2011/0205033 | A1 | 8/2011 | Bandyopadhyay et al. |
| 2013/0129421 | A1* | 5/2013 | Belzile ............... E02B 15/0807 405/63 |

FOREIGN PATENT DOCUMENTS

| | | |
|---|---|---|
| CN | 202033654 U | 11/2011 |
| CN | 102410045 A | 4/2012 |
| CN | 202472370 U | 10/2012 |
| CN | 102913278 A | 2/2013 |
| CN | 203149381 U | 8/2013 |
| RU | 70 733 U1 | 2/2008 |
| RU | 2 401 947 C2 | 10/2010 |

OTHER PUBLICATIONS

The extended European Search Report dated Oct. 18, 2016, by the European Patent Office in corresponding European Application No. 14773627.6. (8 pages).
Office Action (Official Action of Substantive Examination) dated Jan. 30, 2018, by the Russian Patent Office in corresponding Russian Patent Application No. 2015145826/11 (070536) and an English Translation of the Office Action. (13 pages).

* cited by examiner

BUS EXPLOSION PROOF NETWORK AND EXPLOSION PROOF NODE STRUCTURE THEREOF

RELATED APPLICATION

This application claims priority as a continuation application under 35 U.S.C. § 120 to PCT/CN2014/074175, which was filed as an International Application on Mar. 27, 2014 designating the U.S., and which claims priority to Chinese Application 201310102280.2 filed in China on Mar. 27, 2013. The entire contents of these applications are hereby incorporated by reference in their entireties.

FIELD

The present disclosure relates to explosion proof technologies, such as controller area network (CAN) bus explosion proof nodes based on intrinsic safety, and a CAN bus explosion proof network of such nodes.

BACKGROUND

Currently, bus technologies in industrial fields are widely used in situations where, for example, dangerous explosive gas and dust environments are present, such as petrochemical, metallurgy, coal, natural gas, and pharmaceutical fields, etc, so as to implement digitalization and networking of sensor nodes. In such field bus technologies, a CAN bus has higher communication reliability and error tolerance compared to known RS232/RS485/RS422.

The CAN bus may be applied in dangerous flammable and explosive situations. At least some nodes in the CAN bus have explosion proof functions. In an implementation of CAN bus explosion proof nodes in a current explosion proof environment, an explosion isolation type method, a pouring encapsulation type method, and a "n"-type method are primarily employed. The first two methods can be complex in manufacturing, difficult to mount, and large in structure size so that the nodes cannot be miniaturized. The "n"-type explosion proof method can merely be applied in a Class II environment but cannot be applied in a Class I environment so as to limit its scope of usage.

SUMMARY

A node structure is disclosed for explosion proof operation in a CAN bus explosion proof network, the node structure comprising: a physical parameter sensor configured to collect one or more physical parameters and convert them into electrical signals; a physical parameter measurement circuit configured to convert the electrical signals converted from physical parameters by the physical parameter sensor into digital signals and transfer them to a master controller; a master controller configured to perform service processing on the digital signals and send processed digital signals to a communication interface module; a data storage module configured to store related data specified for node operation; a communication interface module configured to send the processed digital signals as CAN signals; and a power voltage and current limiting module configured with intrinsic safety technology, the power voltage and current limiting module being configured to limit a maximum open circuit voltage and a maximum short circuit current of the input power.

BRIEF DESCRIPTION OF THE DRAWINGS

So that the above purpose, features, and advantages of the present invention may be readily understood, a detailed description of the exemplary embodiments are given below in connection with accompanying drawings, in which.

DETAILED DESCRIPTION

Figure 1:
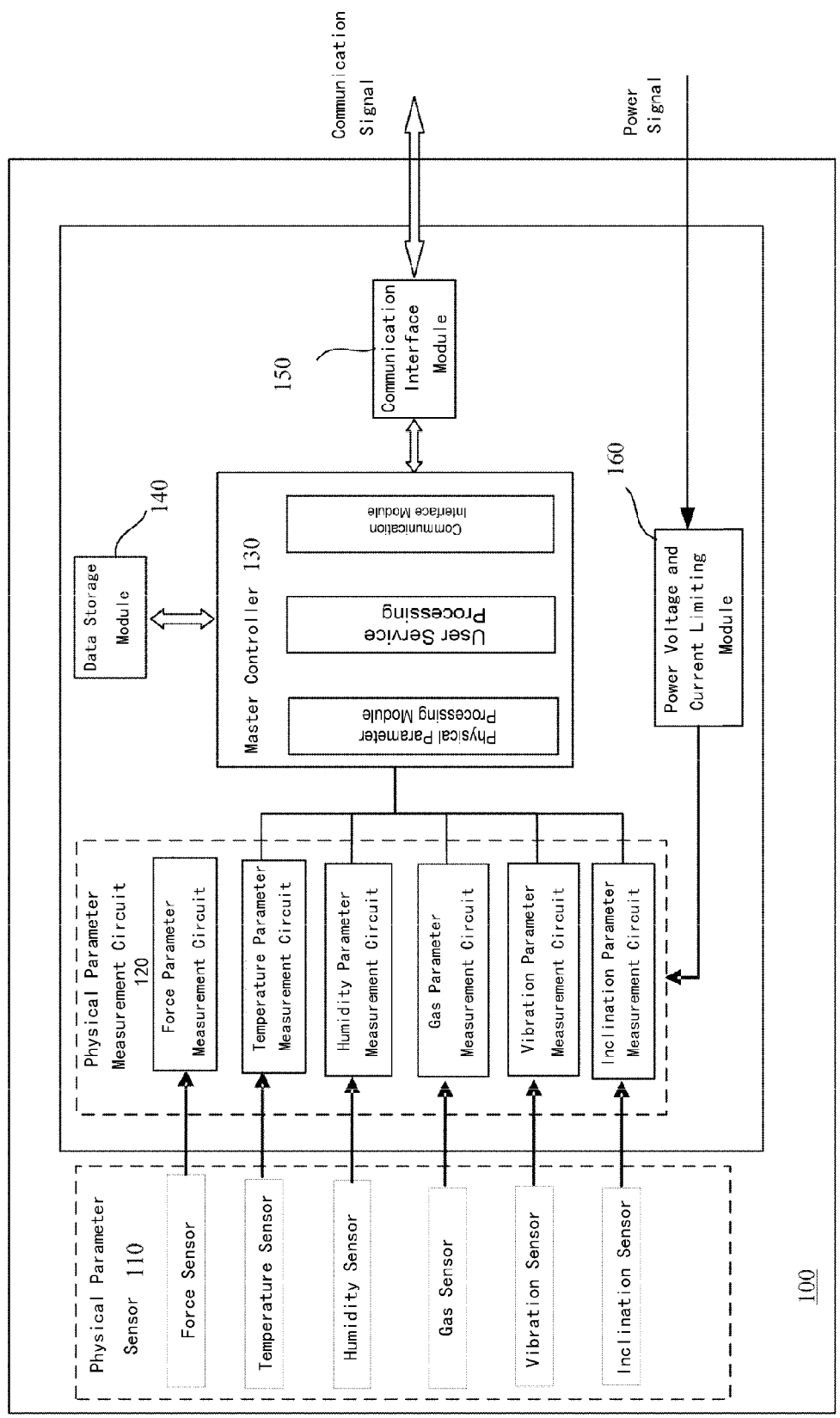
FIG. 1 shows a CAN bus explosion proof node structure according to an exemplary embodiment disclosed herein.

A CAN bus explosion proof network and a CAN bus explosion proof node structure as disclosed herein will now be described in greater detail. By limiting voltage and current power in internal circuits in the explosion nodes, it can be ensured that the explosion proof nodes would not ignite a dangerous combination of explosive gas and dust when the nodes are in normal operation, or experience failures, so as to implement intrinsic safety.

An exemplary explosion proof node structure in a CAN bus explosion proof network is disclosed wherein the explosion proof node structure can include a physical parameter sensor, a physical parameter measurement circuit, a master controller, a data storage module, a communication interface module, and a power voltage and current limiting module. The physical parameter sensor collects one or more physical parameters and converts them into electrical signals. The physical parameter measurement circuit converts the electrical signals of various physical parameters that were converted by the physical parameter sensor into digital signals and transfers them to the master controller. The master controller performs respective service processing to the digital signals and transfers them to the communication interface module while comparing the digital signals of various physical parameters with respective threshold levels to determine whether dangerous situations occur for the explosion proof node, and sends out an alarm when dangerous situations occur for the explosion proof node. The data storage module is configured to store standard parameter values of factory settings, respective threshold levels of the various physical parameters, and related data during operation. The communication interface module sends the processed digital signals. The power voltage and current limiting module connects to the physical parameter measurement circuit and inputs a power supply, and limits a maximum open circuit voltage and a maximum short circuit current of the power.

In an exemplary embodiment, the physical parameters include force, temperature, humidity, gas concentration, vibration, and inclination.

In an exemplary embodiment, the power voltage and current limiting module (i.e., functions as a current breaker) when the power is inverted.

In an exemplary embodiment, the power voltage and current limiting module further limits an integrated equivalent capacitance and an integrated equivalent inductance of energy storage elements internal to the explosion proof node.

In an exemplary embodiment, converting the electrical signals converted from physical parameters by the physical parameter sensor into digital signals is implemented by one or more of the following processes: filtering, amplification, signal conditioning, and analog-to-digital conversion.

In an exemplary embodiment of the present invention, the explosion proof node structure is applied in industrial Ethernet.

The present disclosure also provides a CAN bus explosion proof network having a safe region and a dangerous region, where a plurality of explosion proof node structures are distributed in the dangerous region.

In an exemplary embodiment, the CAN bus explosion proof network includes one or more small topological networks, wherein each small topological network comprises a limited number of the explosion proof node structures.

In an exemplary embodiment, the CAN bus explosion proof network includes a CAN bus safety gate disposed in the safe region or the dangerous region.

In an exemplary embodiment, the CAN bus explosion proof network is applied in industrial Ethernet.

By limiting voltage and current power in internal circuits in the explosion nodes, exemplary embodiments can ensure that the explosion proof nodes will not ignite a dangerous combination of explosive gas and dust when the nodes are in normal operation or experience failures, so as to implement intrinsic safety. Since the intrinsic safety technology is an explosion proof technology designed for circuits and may be applied in Class I environment and Class II environment, exemplary embodiments can miniaturize the CAN bus explosion proof node and expand the application range.

Exemplary embodiments are disclosed with a CAN bus explosion proof node structure that is based on intrinsic safety technology. By limiting voltage and current power in internal circuits in the explosion nodes, it can be ensured that the explosion proof nodes will not ignite a dangerous combination of explosive gas and dust when the nodes are in normal operation or experience failures, so as to implement intrinsic safety.

FIG. 1 shows a CAN bus explosion proof node structure according to an exemplary embodiment. As shown in FIG. 1, the CAN bus explosion proof node structure 100 can be disposed in dangerous places, and includes a physical parameter sensor 110, a physical parameter measurement circuit 120, a master controller 130, a data storage module 140, a communication interface module 150, a power voltage and current limiting module 160. The physical parameter sensor 110 is connected to the physical parameter measurement circuit 120. The physical parameter measurement circuit 120, the data storage module 140, and the communication interface module 150 are connected to the master controller 130. The communication interface module 150 may output communication signals. The power voltage and current limiting module 160 receives power signal inputs, and is connected to the physical parameter measurement circuit 120.

The physical parameter sensor 110 may convert physical parameters such as force, temperature, humidity, gas, vibration, inclination, etc. into electronic signals. To this end, the physical parameter sensor 110 can include various sensors such as: force sensor, temperature sensor, humidity sensor, gas sensor, vibration sensor, inclination sensor, etc.

The physical parameter measurement circuit 120 can convert the electrical signals to digital signals by related circuit processing, such as filtering, amplifying, signal conditioning, analog-to-digital converting, etc., and communicate to the master controller 130 via signal interfaces. Optionally, the signal interfaces may be based on communication protocols such as TTL, SPI, I2C, PWM, etc. The physical parameter measurement circuit 120 can include various measurement circuits corresponding to various sensors; for example, force parameter measurement circuit, temperature parameter measurement circuit, humidity parameter measurement circuit, gas parameter measurement circuit, vibration parameter measurement circuit, inclination parameter measurement circuit, etc.

The master controller 130 can include a physical parameter processing module, a user service processing module, and a communication protocol processing module. The master controller 130 performs respective service processing procedures according to users' specifications and/or requirements, generates CAN signals via the communication protocol processing module, and performs data transfer, and diagnosis information and instructions interactions with other nodes in the form of a CAN protocol via the communication interface module 150.

The operative features of the master controller in the present disclosure are described with regard to the functions performed. It is to be understood that such a device in the system is implemented by a computer processing device having a processor and a non-transitory computer-readable recording medium (e.g., ROM, hard disk drive, flash memory, optical memory, etc.) that has recorded thereon a computer program that, when executed by the processor, causes the processor to perform the operative features of that device. The processor can be a general-purpose processor (e.g., processors produced by Intel or AMD) configured to execute the computer program tangibly recorded on the non-transitory computer-readable recording medium. Alternatively, the processor can be an application specific processor that is specifically configured to carry out the operative features described herein.

The data storage module 140 is used to store standard parameter values of factory settings, which are calculated in combination with physical parameters collected during operations of the explosion proof node 100 to implement real-time processing and transmission of physical parameters. During operation, the explosion proof node 100 may store parameters and data that need to be recorded into the data storage module 140.

The master controller 130 may read force data from the force parameter measurement circuit, temperature data from the temperature parameter measurement circuit, inclination data from the inclination parameter measurement circuit; calculate real-time force, temperature, and inclination data in combination with the standard parameter values stored in the data storage module 140; and transfer the processed data in a predetermined format. In addition, the master controller 130 compares the measured data with a force threshold, a temperature threshold, and an inclination threshold stored in the data storage module 140 to determine whether the explosion proof node has illegal or dangerous situations such as being overloaded, over temperature or over-inclined, send out an alarm, and record into the data storage module 140.

The master controller 130 reads humidity data from the humidity parameter measurement circuit, gas concentration and pressure data from the gas parameter measurement circuit, vibration data from the vibration parameter measurement circuit; performs respective processing; and transfers in a predetermined format. In addition, the master controller 130 compares the measured data with a humidity threshold, a gas concentration threshold, a gas pressure threshold, and a vibration threshold stored in the data storage module 140 to determine whether the explosion proof node has illegal or dangerous situations such as going beyond the humidity limit, the gas concentration limit, the gas pressure limit, the vibration limit, send out an alarm, and record into the data storage module 140.

Figure 2:
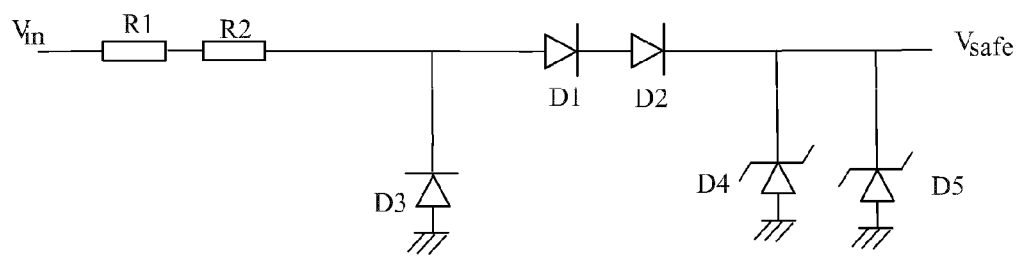
FIG. 2 shows an exemplary power voltage and current limiting module of the CAN bus explosion proof node structure as shown in FIG. 1.

An exemplary structure of the power voltage and current limiting module 160 is shown in FIG. 2. The exemplary power voltage and current limiting module 160 is designed by use of intrinsic safety technologies, is primarily constituted of protection elements such as current limiting resistors R1, R2, Schottky diodes D1, D2, Zener diodes D4, D5, and has multiple designs. The parameters of the current limiting resistors R1, R2 can be selected according to the maximum short circuit current of intrinsic safety explosion proof that is specified in GB3836.4-83/IEC60079-11. The specific parameters of the Zener diodes D4, D5 can limit a maximum open circuit voltage and a maximum short circuit current of an input power supply according to the maximum open circuit voltage that is specified in GB3836.4-83/IEC60079-11. The Schottky diodes D1, D2 are cutoff (open) when the power supply is inverted so as to prevent dangerous failures caused by power inverting. Meanwhile, according to the allowable maximum capacitance and inductance parameters specified in GB3836.4-83/IEC60079-11, integrated equivalent capacitance and integrated equivalent inductance of energy storage elements such as capacitors and inductors internal to the explosion proof node can be limited to ensure that, when the explosion proof node functions normally or experience failures such as short-circuiting, open circuiting, grounding, or power failure, electric spark energy and heat effect temperature that are generated will not ignite dangerous combinations of gas and dust in the environment. In other words, intrinsic safety can be ensured according to a circuit principle.

Figure 3:
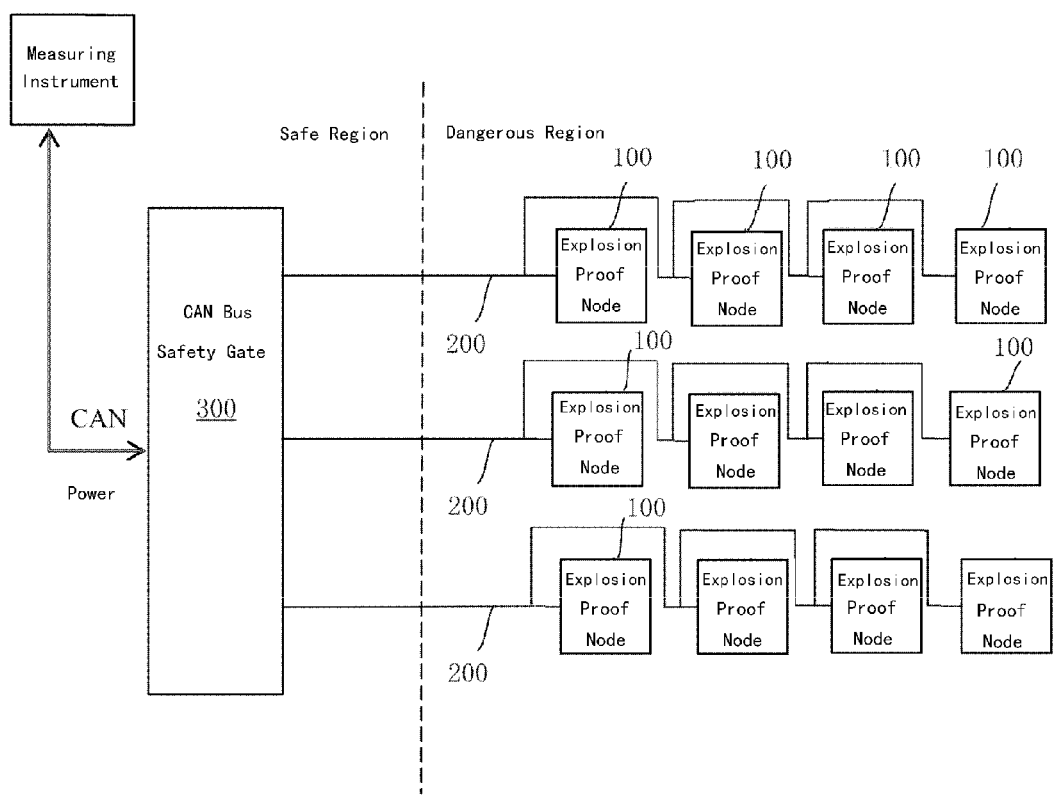
FIG. 3 shows a CAN bus explosion proof network according to an exemplary embodiment disclosed herein

FIG. 3 shows an exemplary CAN bus explosion proof network according to an exemplary embodiment. As shown in FIG. 3, the CAN bus explosion proof network can include one or more CAN bus explosion proof node(s) 100 as previously described, an explosion proof cable 200, and a CAN bus safety gate 300. The CAN bus safety gate 300 may be disposed in a safe region or a dangerous region, be designed with intrinsic safety technology and isolation technology, process the direct circuit regulated power supply that is derived by regulating and filtering an input power supply with a fuse circuit, a voltage limiting circuit, and a current limiting circuit, and provide the direct circuit regulated power supply to the CAN explosion proof node 100 located in the dangerous region.

To limit the energy of the CAN bus network system, the explosion proof node network may be in form of a packet network topology as shown in FIG. 3. For example, the CAN bus explosion proof nodes may constitute a plurality of small topological networks according to a practical requirement that are respectively connected to the CAN bus safety gate 300. By reducing the number of CAN bus explosion proof nodes in each topological network, the CAN bus energy in each topological network can be reduced.

Since the intrinsic safety technology is an explosion proof technology designed for circuits and may be applied in Class I environment and Class II environment, exemplary embodiments can miniaturize the CAN bus explosion proof node and expand the application range.

While the present invention has been described in connection with specific embodiments, those skilled in the art will readily understand that the above exemplary embodiments are merely used to illustrate aspects of the present invention and may have various equivalent variations or replacements without departing from the spirit of the present invention. Therefore, all the variations and modifications to the above embodiments within the spirit of the present invention fall within the scope of the claims of the present invention.

What is claimed is:

1. A CAN bus explosion proof network comprising:
    a designated safe region;
    a designated dangerous region; and
    a CAN bus safety gate,
    wherein the CAN bus safety gate is configured with intrinsic safety technology and isolation technology and is disposed in the designated safety region on the designated dangerous region,
    wherein a plurality of explosion proof nodes are distributed in the dangerous region with each node being connected to the CAN bus safety gate,
    wherein the CAN bus explosion proof network comprises at least one topological network containing less than the plurality of explosion proof nodes, and
    wherein a structure of a node includes:
        a physical parameter sensor configured to collect one or more physical parameters and convert them into electrical signals;
        a physical parameter measurement circuit configured to convert the electrical signals converted from physical parameters by the physical parameter sensor into digital signals and transfer them to a master controller;
        a master controller configured to perform service processing on the digital signals and send processed digital signals to a communication interface module;
        a data storage module configured to store related data specified for node operation;
        a communication interface module configured to send the processed digital signals as CAN signals;
        a power voltage and current limiting module configured with intrinsic safety technology, the power voltage and current limiting module being configured to limit a maximum open circuit voltage and a maximum short circuit current of an input power, wherein all the digital signals are transmitted via a CAN bus.

2. The CAN bus explosion proof network as recited in claim 1, wherein the physical parameters comprise:
    force, temperature, humidity, gas concentration, vibration, and inclination.

3. The CAN bus explosion proof network node as recited in claim 1, wherein the power voltage and current limiting module is configured to break a circuit when power is inverted.

4. The CAN bus explosion proof network as recited in claim 1, wherein the power voltage and current limiting module is configured for explosion proof operation, and to limit an integrated equivalent capacitance and an integrated equivalent inductance of energy storage elements inside a node.

5. The CAN bus explosion proof network as recited in claim 1, wherein the master controller is configured to compare digital signals of various physical parameters to respective threshold levels and to send out an alarm when specified dangerous situations occur for a node.

6. The CAN bus explosion proof network as recited in claim 1, the data storage module being configured to store standard parameter values of factory settings, respective threshold levels of the various physical parameters, and related data during operation.

7. The CAN bus explosion proof network as recited in claim 1, wherein the physical parameter measurement circuit is implemented by one or more of the following: filtering, amplification, signal conditioning, and analog-to-digital conversion.

8. The CAN bus explosion proof network as recited in claim 1, wherein a node structure is in combination with an industrial Ethernet.

9. The CAN bus explosion proof network as recited in claim 1, comprising:
the CAN bus explosion proof network in combination with an industrial Ethernet.

10. The CAN bus explosion proof network as recited in claim 2, wherein the power voltage and current limiting module is configured to break a circuit when power is inverted.

11. The CAN bus explosion proof network as recited in claim 10, wherein the power voltage and current limiting module is configured for explosion proof operation, and to limit an integrated equivalent capacitance and an integrated equivalent inductance of energy storage elements inside a node.

12. The CAN bus explosion proof network as recited in claim 11, wherein the master controller is configured to compare digital signals of various physical parameters to respective threshold levels and to send out an alarm when specified dangerous situations occur for a node.

13. The CAN bus explosion proof network as recited in claim 12, the data storage module being configured to compare standard parameter values of factory settings, respective threshold levels of the various physical parameters, and related data during operation.

14. The CAN bus explosion proof network as recited in claim 13, wherein the physical parameter measurement circuit is implemented by one or more of the following: filtering, amplification, signal conditioning, and analog-to-digital conversion.

15. The CAN bus explosion proof network as recited in claim 14, wherein a node structure is in combination with an industrial Ethernet.

* * * * *

UNITED STATES PATENT AND TRADEMARK OFFICE
CERTIFICATE OF CORRECTION

PATENT NO. : 10,074,970 B2
APPLICATION NO. : 14/867596
DATED : September 11, 2018
INVENTOR(S) : Ying Zhang et al.

Page 1 of 1

It is certified that error appears in the above-identified patent and that said Letters Patent is hereby corrected as shown below:

In the Claims

Claim 1, Line 7, "...and is disposed in the designated safety region on the" should read -- ...and is disposed in the designated safety region or the --.

Claim 3, Line 1, "The CAN bus explosion proof network node was recited..." should read -- The CAN bus explosion proof network was recited... --.

Signed and Sealed this
Fourth Day of December, 2018

Andrei Iancu
*Director of the United States Patent and Trademark Office*